(12) United States Patent
Prakash et al.

(10) Patent No.: US 8,173,826 B2
(45) Date of Patent: May 8, 2012

(54) ENRICHMENT OF MONOUNSATURATED ACIDS/ESTERS IN VEGETABLE OIL—OR ANIMAL FAT-BASED FEEDSTOCK USING METAL SALTS DISSOLVED IN IONIC LIQUIDS

(75) Inventors: Prakhar Prakash, San Ramon, CA (US); Michael Driver, San Francisco, CA (US); Zunqing He, San Rafael, CA (US)

(73) Assignee: Chevron U.S.A. Inc., San Ramon, CA (US)

(*) Notice: Subject to any disclaimer, the term of this patent is extended or adjusted under 35 U.S.C. 154(b) by 284 days.

(21) Appl. No.: 12/486,463

(22) Filed: Jun. 17, 2009

(65) Prior Publication Data
US 2010/0324318 A1    Dec. 23, 2010

(51) Int. Cl.
C11B 7/00 (2006.01)
(52) U.S. Cl. .......................................... 554/206
(58) Field of Classification Search ................ 554/206
See application file for complete search history.

(56) References Cited

U.S. PATENT DOCUMENTS

| | | | |
|---|---|---|---|
| 2,838,480 | A | 6/1958 | Swem et al. |
| 4,049,688 | A | 9/1977 | Neuzil et al. |
| 4,529,551 | A | 7/1985 | Cleary et al. |
| 5,189,189 | A * | 2/1993 | Misawa et al. ........... 554/194 |
| 5,354,877 | A | 10/1994 | Behr et al. |
| 6,623,659 | B2 | 9/2003 | Munson et al. |
| 2005/0129831 | A1 | 6/2005 | Fabritius |
| 2008/0119444 | A1 | 5/2008 | Leher |
| 2008/0248982 | A1 | 10/2008 | Miller et al. |

FOREIGN PATENT DOCUMENTS

| | | |
|---|---|---|
| JP | 09143488 | 6/1997 |
| JP | 2000044983 | 2/2000 |
| JP | 2001072993 | 3/2001 |

OTHER PUBLICATIONS

PCT Notification of Transmittal of the International Search Report and the Written Opinion of the International Searching Authority, or the Declaration dated Feb. 25, 2011.
Adlof et al, "Analysis of the Monoenoic Fatty Acid Distribution in Hydrogenated Vegetable Oils by silver-Ion High-Performance Liquid Chromatography," J. Am. Oil Chem. Soc., vol. 72(5), pp. 571-574, 1995.
Antolin et al., "Optimisation of biodiesel production by sunflower oil transesterification," Bioresource Technology, vol. 83, pp. 111-114, 2002.
Bertran, "The preparation of pure oleic acid," Rucueil des Travaux Chimiques des Pays—Bas et de la Belgique, vol. 46, pp. 397-401, 1927.

(Continued)

*Primary Examiner* — Deborah D Carr
(74) *Attorney, Agent, or Firm* — Edward T. Mickelson; Parul Anderson

(57) ABSTRACT

In some embodiments, the present invention relates to an enrichment process that involves a separation and/or fractionation and/or enrichment of monounsaturated fatty acid/ester molecules from polyunsaturated fatty acid/ester molecules or, correspondingly, monounsaturated molecules from saturated molecules. Such processes are at least partially based on π(pi)-complexation between metal ions and unsaturated bonds of the extractible molecules (fatty acids/esters), wherein a greater degree of unsaturation provides for greater coordinating (bond) strength and corresponding selectivity in the associated π-complexation with metal ions.

27 Claims, 11 Drawing Sheets

OTHER PUBLICATIONS

Bond, "Adsorption and Co-ordination of Unsaturated Hydrocarbons with Metal Surfaces and Metal Atoms," Discuss. Faraday Soc., vol. 41, pp. 200-214, 1966.

Dobson et al., "Silver Ion Chromatography of lipids and Fatty Acids," J. Chromatography B, vol. 671, pp. 197-222, 1995.

Emken et al., "Separation of Saturated, Unsaturated, and Acetylenic Fatty Acid Isomers by Sliver Resin Chromatography," J. Am. Oil. Chem. Soc., vol. 55, pp. 561-563, 1978.

Falk et al., "The effect of fatty acid composition on biodiesel oxidative stability," vol. 106, pp. 837-843, 2004.

Fleisch et al., "2002—Emergence of the Gas-to-Liquids Industry: a Review of Global GTL Developments," J. Natural Gas Chemistry, vol. 11, pp. 1-14, 2002.

Haas, "Improving the economics of biodiesel production through the use of low value lipids as feedstocks: vegetable oil soapstock," Fuel Processing Technology, vol. 86, pp. 1087-1096, 2005.

Hartsuch, "A Study of the Methods of Separation of Oleic Acid from Saturated Acids and Linoleic Acid with Observations on the Preparation of Oleic Acid," J. Am. Chem. Soc., vol. 61(5), pp. 1142-1144, 1939.

Kang et al., "Control of Ionic Interaction in Silver Salt-Polymer Complexes with Ionic Liquids: Implications for Facilitated Olefin Transport," Chem. Mater., vol. 18(7), pp. 1789-1794, 2006.

Kodali, "High performance ester lubricants from natural oils," Industrial Lubrication & Tribology, vol. 54(4), pp. 165-170, 2002.

Lambou et al., "Modified Thiocyanogen Reagent and Method," Oil & Soap, vol. 22, pp. 226-232, 1945.

Marsh et al., "Room Temperature Ionic Liquids as Replacements for Conventional Solvents—A Review," Korean J. Chem. Eng., vol. 19(3), pp. 357-362, 2002.

Mehta et al., "Preparation and properties of Activated Urea," Grasas y Aceites, vol. 10, pp. 27-29 (1959).

Quinn et al., "Coordination Compounds of Olefins with Anhydrous Silver Salts," Canadian Journal of Chemistry, vol. 43, pp. 2896-2910, 1965.

Riemenschneider et al., "Methods of Analysis of Mixtures of Oleic, Linoleic and Saturated Esters and Their Application to Highly Purified Methyl Oleate and Methyl Linoleate," Oil & Soap, vol. 16, pp. 219-221, 1939.

Rudnick, L. R. and S. Z. Erhan, "Natural Oil as Lubricants," in *Synthetics, Mineral Oils, and Bio-Based Lubricants: Chemistry and Technology*, CRC—Taylor and Francis, New York, Chapter 21 (pp. 353-360), 2006.

Seddon et al., "Influence of chloride, water, and organic solvents on the physical properties of ionic liquids," Pure Appl. Chem., vol. 72(12), pp. 2275-2287, 2000.

Traitler, "Fractionation of Blackcurrant Seed Oil," J. Am. Oil Chem. Soc., vol. 65(5), pp. 755-760, 1988.

Wagner et al., "Lubricant base fluids based on renewable raw materials: Their catalytic manufacture and modification," Applied Catalysis A, vol. 221, pp. 429-442, 2001.

Weitkamp, "The Amplified Distillation of Methyl Esters of Fatty Acids," J. Am. Oil Chem. Soc., vol. 24, pp. 236-238, 1947.

Whitby, "Market Share of bio-lubricants in Europe and the USA," Lipid Technology, vol. 16, pp. 333-337, 2000.

\* cited by examiner

Table 1

| Vegetable Oil | Saturated Acids | | | | | Mono unsaturated Acids | Polyunsaturated Acids | | Unsaturated / Saturated ratio |
|---|---|---|---|---|---|---|---|---|---|
| | Capric C10:0 | Lauric C12:0 | Myristic C14:0 | Palmitic C16:0 | Stearic C18:0 | Oleic C18:1 | Linoleic C18:2 | Alpha-Linoleic C18:3 | |
| Canola | - | - | - | 4 | 2 | 62 | 22 | 10 | 15.7 |
| Corn | - | - | - | 11 | 2 | 28 | 58 | 1 | 6.7 |
| Cottonseed | - | - | - | 22 | 3 | 19 | 54 | 1 | 2.8 |
| Olive | - | - | - | 13 | 3 | 71 | 10 | 1 | 4.6 |
| Palm | - | - | - | 46 | 4 | 40 | 10 | - | 1.0 |
| Peanut | - | - | - | 11 | 2 | 48 | 32 | - | 4.0 |
| Safflower | - | - | - | 7 | 2 | 13 | 78 | - | 10.1 |
| Sesame | - | - | - | 9 | 4 | 41 | 45 | - | 6.6 |
| Soyabean | - | - | - | 11 | 4 | 24 | 54 | 7 | 5.7 |
| Sunflower* | - | - | - | 7 | 5 | 19 | 68 | 1 | 7.3 |
| Rapeseed** | - | - | - | 5 | 4 | 33 | 20 | 68 | 1 |
| Walnut | - | - | - | 11 | 15 | 28 | 51 | 5 | 5.3 |
| Grapeseed | - | - | - | 8 | 4 | 15 | 73 | - | 7.3 |

*High oleic acid sunflower oil can have 78% oleic acid and 15% Linoleic acid
** 30-50% C20:1 (Eicosenoic) and C22:1 (Erucic) acids found

*Fig. 2*

Approach 1:
Approach 2:
General Separation Scheme:
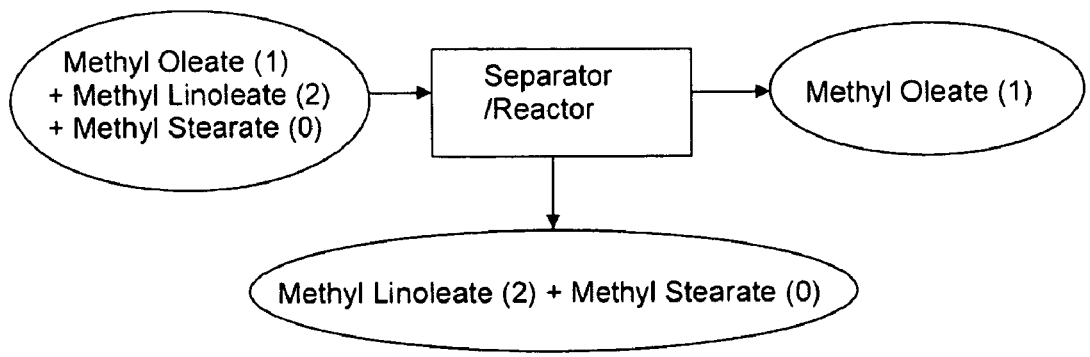
Fig. 3

Table 2

| Methods | Advantages | Limitations |
|---|---|---|
| Distillation | • Examples exist of recovery of various fatty acid fractions | • Fractional distillation at reduced pressure required<br>• Energy intensive |
| Salt solubility | • Useful for separation of saturated fatty acid from unsaturated fatty acids if lead salt-ethanol is used<br>• Useful for separation of polyunsaturated fatty acid from monounsaturated fatty acid if barium salt-benzene is used | • Complete separation of saturated acids from unsaturated acids not possible |
| Low temperature crystallization | • May be more efficient than the salt solubility methods<br>• Introduced as an alternative to distillation<br>• Can separate saturated fatty acid as well as monosaturated fatty acid | • Synthesizing extremely pure oleic acid will require dropping the temperature to near -50°C<br>• Can be energy intensive |
| Adsorption Techniques | • Very cost effective<br>• Easy to operate<br>• Can be used to remove polyunsaturated acid molecules<br>• High selectivity may be observed<br>• May be a good polishing agent | • Regeneration efficiency may be poor<br>• The adsorption capacity may be low, requiring large quantities of sorbent |
| Partial Hydrogenation | • Very useful technique to enrich fatty acid high in linoleic to oleic | • Cost of hydrogen, catalyst, and the reactor may be high<br>• Operationally not as simple as adsorption methods |
| Phase Separation | • Separation selectivity of nearly two can be achieved | • Loss of acid in one phase<br>• May involve use of toxic chemicals |
| Ionic Liquids | • May have very high selectivity<br>• Easy to use | • May be expensive<br>• Not applied for bulk process. |
| Urea Complexation | • Can obtain high degree of selectivity for oleic acid over linoleic acid via complexation | • Additional steps needed to remove oleic acid from urea complex and reuse<br>• Generally requires oleic acid:linoleic acid ratio of 3:1 in feed stock<br>• Requires 3:1 ratio of urea to oil |

*Fig. 4*

Table 3

| Silver salt concentration | | Feed (No extraction) | 5% Ag salt | 10% Ag salt | 15% Ag salt | 20% Ag salt |
|---|---|---|---|---|---|---|
| Feedstock 1 | Oleic concentration | 6.0 | 2.75 | 0.57 | 0.07 | 0.02 |
| | Linoleic concentration | 14.0 | 0.32 | 0.02 | 0.00 | 0.00 |
| Feedstock 2 | Oleic concentration | 10.0 | 4.81 | 1.08 | 0.21 | 0.03 |
| | Linoleic concentration | 10.0 | 0.21 | 0.08 | 0.00 | 0.00 |
| Feedstock 3 | Oleic concentration | 14.0 | 6.24 | 1.64 | 0.11 | 0.04 |
| | Linoleic concentration | 6.0 | 0.10 | 0.01 | 0.00 | 0.00 |

Fig. 8

Equation 1

$$\alpha = \frac{\text{Concentration of linoleic acid in ionic liquid phase} / \text{Concentration of oleic acid in ionic liquid phase}}{\text{Concentration of linoleic acid in hydrocarbon phase} / \text{Concentration of oleic acid in hydrocarbon phase}}$$

*Fig. 9*

Table 4

|   | Capacity (g/g of Ag salt) | Separation Factor $(IL_{ir}/IL_{ol})/(Hept_{in}/Hept_{ol})$ |
|---|---|---|
| 1 | 0.48 | 36 |
| 2 | 0.43 | 43 |
| 3 | 0.39 | 18 |
| Reported separation factor of ~5 in literature | | |

*Fig. 11*

ENRICHMENT OF MONOUNSATURATED ACIDS/ESTERS IN VEGETABLE OIL—OR ANIMAL FAT-BASED FEEDSTOCK USING METAL SALTS DISSOLVED IN IONIC LIQUIDS

FIELD OF THE INVENTION

This invention relates generally to ester-based biofuels and biolubricants, and more specifically to methods for manipulating the unsaturation level of fatty ester molecules contained therein.

BACKGROUND

Conventional lubricants include petroleum-based esters and are known to contaminate soil and water through fluid losses in lubrication systems. They are widely used in the automotive industry and in a variety of other industrial applications. In 2002, the total lubricants market for Western Europe was 5,020,000 tons per year; and for the United States it was 8,250,000 tons per year. See L. R. Rudnick and S. Z. Erhan, "Natural Oil as Lubricants," in Synthetics, Mineral Oils, and Bio-Based Lubricants: Chemistry and Technology, CRC-Taylor and Francis, New York, Chapter 21 (pp. 353-360), 2006.

In recent times, a pursuit for "greener" technology and carbon-neutral products has led to an increasing demand for biolubricants such as bioesters derived from vegetable oils and/or animal fats, the annual growth rate of these biolubricants being over 10%. The biolubricants market in 2000 was 50,000 tons per year in Western Europe and 25,000 tons per year in the United States (Whitby, "Market Share of biolubricants in Europe and the USA," Lipid Technology, vol. 16, pp. 333-337, 2000). If the quality of biolubricants is improved, this improvement will accelerate their demand beyond the traditional "total loss lubricant" sector. Simultaneously, with dramatic fluctuations in crude oil prices, there has been an increased focus on alternative sources of energy. Annual production of biodiesel (primarily fatty acid methyl ester (FAME)-based) in the United States for 2001 has been estimated at 57-76 million liters, with European production more than 10 times that amount. It is predicted that, in the United States alone, production will reach 1.3 billion liters annually by 2011 (Haas, "Improving the economics of biodiesel production through the use of low value lipids as feedstocks: vegetable oil soapstock," Fuel Processing Technology, vol. 86, pp. 1087-1096, 2005). Thus, there is a steadily increasing level of interest in the growing market of biolubricants and biodiesel, and this interest is likely to be sustained for the foreseeable future.

1. Biomass Precursors

Typically, precursor material (i.e., feedstock) for both biolubricants and biodiesel (a representative biofuel) is a triglyceride-bearing material such as vegetable oil and/or animal fat (tallow). A key concern with the use of these feedstocks is their generally poor oxidation stability. In the case of biolubricants, oxidation causes polymerization and degradation. Polymerization increases the molecular weight of bioesters, which in turn leads to increased viscosity, gelling, and a general loss of lubricant functionality. Degradation leads to degradation (breakdown) products that are volatile, corrosive, and which can diminish the structure and properties of the lubricants. See, e.g., Wagner et al., "Lubricant base fluids based on renewable raw materials: Their catalytic manufacture and modification," Applied Catalysis A, vol. 221, pp. 429-442, 2001.

Biodiesel (a primary biofuel) prepared from vegetable oil can deteriorate due to oxidative polymerization, which can lead to formation of insoluble products that can cause problems within automotive fuel systems—especially injection pumps. The ease of oxidation generally depends on the fatty acid composition of the vegetable oil (see Falk et al., "The effect of fatty acid composition on biodiesel oxidative stability," vol. 106, pp. 837-843, 2004). Unsaturated fatty acyl chains react with molecular oxygen to form free radicals that lead to polymerization and fragmentation. The rate of oxidation depends on the degree of unsaturation of a fatty acyl chain. If the rate of oxidation is normalized to 1 for a saturated fatty acid such as stearic acid, it is nearly 10 for oleic acid (single double bond), 100 for linoleic acid (2 double bonds), and 200 for linolenic acid (3 double bonds). This instability is attributed to the presence of allylic methylene groups between the double bonds. In addition, under thermal conditions the double bonds in polyunsaturated fatty acids isomerize to form conjugated acids, which are more susceptible to polymerization. See, e.g., Kodali, "High performance ester lubricants from natural oils," Industrial Lubrication & Tribology, vol. 54(4), pp. 165-170, 2002.

Another concern with the use of vegetable oils as precursor material for biolubricants and biofuels is the potential for poor low temperature flow behavior for the resulting biolubricants and biodiesel derived therefrom (see Wagner, vide supra). Saturated fatty acids generally have a high pour point, implying that they (and any esters derived therefrom) may not be suitable for applications at low temperatures because they can freeze and/or otherwise no longer flow sufficiently. Unsaturated fatty acids have lower pour points because they have a disorganized crystal lattice due to the presence of one or more double bonds. To illustrate this point further, stearic acid (a fully saturated fatty acid) freezes at 70° C., oleic acid (a monounsaturated fatty acid with a single double bond in its fatty chain) freezes at 14° C., and linoleic acid (a polyunsaturated fatty acid with two double bonds in its fatty chain) freezes at −5° C.

The two aforementioned concerns (oxidation stability and low-temperature flow properties) are largely in conflict, as they lead to situations where better oxidation resistance properties for these applications (biolubricants and biodiesel) requires the use of vegetable oil rich in saturated fatty acid, but better flow behavior mandates the use of unsaturated fatty acids. To address any such conflict, a balance must often be found whereby the biolubricant or biodiesel composition is optimized for a particular application in terms of the compositional ratio of unsaturated to saturated molecules. For a pictorial representation of these conflicting optimization parameters, see FIG. 1.

Fatty acid composition and distribution vary widely among various vegetable oils (after hydrolysis). Referring to Table 1 (FIG. 2), at one end of the spectrum is a vegetable oil with high percentage of saturated fatty acids (palm oil), and at the other end is a vegetable oil with high percentage of polyunsaturated fatty acids (rapeseed oil). Ideally, a feedstock rich in oleic acid will lead to better quality esters and therefore better quality biolubricants or biodiesel. As feedstock selection is often based on its price and availability, oleic acid enrichment can have beneficial results and produce high oleic content bioesters regardless of the initial character of the triglyceride-bearing feedstock. Such enrichment permits a tailoring of properties to yield a well-defined biolubricant/biofuel from any of a number of different feedstocks of differing character.

2. Generation of Free Lipids

Existing strategies for such above-mentioned separations first require conversion of triglycerides into free lipids.

Depending on the approach taken, the resulting free lipids are in the form of either fatty acids or fatty esters. Referring to FIG. 3, Approach 1 illustrates the transesterification of triglycerides with methanol to yield multiple methyl ester species and glycerol (glycerin). Still referring to FIG. 3, where the multiple methyl ester species comprise methyl oleate (1), methyl linoleate (2), and methyl stearate (0), such species having a number (n) of carbon-carbon double bonds (—C=C—) in their fatty (aliphatic) chains as shown in parentheses. Such methyl ester species can be separated from glycerol and treated to yield products that are substantially enriched in each of the individual fatty esters.

Referring again to FIG. 3, as an alternative to the above-described transesterification approach to generating free lipids, Approach 2 illustrates the hydrolysis of triglycerides to yield glycerol and free fatty acids. Similar to the separation of the fatty esters by degree of saturation, the fatty acids can also be analogously separated and subsequently esterified.

3. Separation of Fatty Acids/Esters

Some important procedural factors/elements, from the standpoint of preparation of good quality biolubricants, include, but are not limited to, an approach to separate oleic acid (monounsaturated) from linoleic acid (polyunsaturated), an approach to separate stearic acid and other saturated fatty acids from the unsaturated ones, an approach to separate methyl oleate (monounsaturated) from methyl linoleate (polyunsaturated), and an approach to separate methyl stearate and other esters of saturated fatty acids from unsaturated esters.

Often, the techniques to separate fatty acids are also applicable for the corresponding esters. This implies that both the approaches discussed above can be considered for the development of biolubricants. Secondly, the separation of saturated molecules from unsaturated molecules is relatively easy due to significant differences in their freezing point. The most challenging step is to separate linoleic acid from oleic acid (or the corresponding esters). In the following section, past work is reported on fatty acid separations, with emphasis on separating linoleic (polyunsaturated) acid from oleic (monounsaturated) acid.

4. Current Separation Technologies

Distillation, as a technique, has been reported for the separation of fatty acid methyl esters derived from vegetable oil. Both fractional distillation and molecular distillation have been applied for fatty acid separation. Weitkamp reported separating out methyl esters of cottonseed oil-derived fatty esters through an application of amplified distillation carried out at 2 mm Hg (Torr) pressure. The cuts were obtained at near 120° C. and 160° C. This technique could separate saturated esters from unsaturated esters, but no separation of unsaturated fatty acid esters, by degree of unsaturation, was obtained. See Weitkamp, "The Amplified Distillation of Methyl Esters of Fatty Acids," J. Am. Oil Chem. Soc., vol. 24, pp. 236-238, 1947. A lot of work has been reported in the literature on this technique for analysis of fats and oils—particularly in the first half of the twentieth century. Molecular distillation is another technique aimed at reducing the tortuous path between the boiler and the condenser in a conventional distilling apparatus. It is carried out at very low pressures (0.01 to 0.001 mm Hg). Lambou and Dollar were able to prepare high purity linoleic acid by molecular distillation (Lambou et al., "Modified Thiocyanogen Reagent and Method," Oil & Soap, vol. 22, pp. 226-232, 1945). The process of separation through distillation, however, is an energy intensive process.

Low-temperature crystallization is a widely applied process that was developed as a more efficient alternative to the moderately efficient distillation process developed in the 1930s for the separation of mixed acids and esters derived from natural fats. A look at the properties of fatty acids and their ester analogues indicates that the melting points of stearic/oleic/linoleic are widely separated and can therefore be considered for low-temperature crystallization. Bertran described a method to separate an oleic acid and linoleic acid mixture by crystallizing three times from acetone solution (1:1) at −10° C. to −15° C. and separation of the crystalline solid acid at −20° C. (Bertran, "The preparation of pure oleic acid," Rucueil des Travaux Chimiques des Pays-Bas et de la Belgique, vol. 46, pp. 397-401, 1927). The product was a highly pure oleic acid. Low temperature crystallization has been tried successfully to separate saturated acids from unsaturated ones. Hartsuch made a comparison of the lead salt-alcohol, barium salt-alcohol-benzene, and low temperature crystallization methods for the separation of oleic acid from a saturated and unsaturated acid mixture and concluded that the efficiency of the low temperature crystallization process was the highest (Hartsuch, "A Study of the Methods of Separation of Oleic Acid from Saturated Acids and Linoleic Acid with Observations on the Preparation of Oleic Acid," J. Am. Chem. Soc., vol. 61(5), pp. 1142-1144, 1939). Wheeler and Riemenschneider have used low temperature crystallization for separation of fatty acid methyl esters as well (see Riemenschneider et al., "Methods of Analysis of Mixtures of Oleic, Linoleic and Saturated Esters and Their Application to Highly Purified Methyl Oleate and Methyl Linoleate," Oil & Soap, vol. 16, pp. 219-221, 1939).

Adsorption techniques can find significant application in the separation of unsaturated polyunsaturated fatty acids (as well as their methyl esters) based on their degree of unsaturation. UOP has patented a process for separating fatty acid esters by selective adsorption using an X or Y zeolite adsorbent with an exchangeable cationic site with metal ions from Group 1A (U.S. Pat. No. 4,049,688). This process uses high temperatures and pressures (e.g., 125° C. and 50 psig). Another UOP process for separating oleic acid from linoleic acid using a molecular sieve comprising silicalite is described in U.S. Pat. No. 4,529,551.

Salt-solubility methods are largely based on the proclivity of saturated and unsaturated fatty acids to form salts with metallic ions, the solubility of such salts in water and organic solvents varying with the nature of the metallic ion and the chain length, the degree of unsaturation, and other characteristics of the fatty acid component. The method is not easily quantifiable, and it is primarily utilized to generally remove saturated fatty acids from unsaturated ones. The most common method based on salt solubility is the lead salt-alcohol method which is based on the differential solubility of lead salts or soaps of fatty acids in diethyl ether or ethanol. The process is very non-specific, and it is primarily applicable for removing saturated fatty acids (for which alternative options are available). Moreover, for environmental and toxicological reasons, the use of lead salts is highly undesirable—especially when the end product is a biolubricant or a biodiesel.

Phase separation is another technique employed to concentrate/enrich the content of a particular type of fatty acid in one phase. Partition coefficients of fatty acids in different solvent systems have been reported in the literature (see, e.g., Mehta et al., "Preparation and Properties of Activated Urea," Grasas Aceites (Sevelle, Spain), vol. 10, pp. 27-29, 1959). For example, in a mixture of heptane (4 volumes) and acetonitrile-methanol-acetic acid (1 volume each), oleic acid partitions 1.9 times in the heptane phase while linoleic acid partitions only 0.9 times. This technique can therefore be used to concentrate oleic acid in n-heptane. The key concern is the use of some solvents that are considered particularly useful for this process (e.g., acetonitrile). Similarly, methyl esters of oleic acid and linoleic acid can be separated using a pentane-hexane/acetonitrile. Some solvents such as acetonitrile and formamide are highly toxic. An 80% ethanol solution can be considered as a substitute for acetonitrile.

Partial hydrogenation of fatty acids is another approach to enriching vegetable or vegetable-derived oil in monounsaturated oleic acid. The process typically requires passing hydrogen gas under 30-40 psi pressure and a noble metal-based catalyst through an oil containing a mixture of fatty acids and partially hydrogenating the polyunsaturated fatty acid molecules to yield oil rich in monounsaturated fatty acid. Catalytic hydrogenation to produce mono-unsaturated fatty acids has been reported by Behr et al. in U.S. Pat. No. 5,354,877, where poly-unsaturated fatty acids were hydrogenated at 0-150° C. and 800-1500 hectopascals (hPa) in the presence of a catalyst. The oleic content reported in the product was over 90%.

Complexation with urea requires dissolving a known amount of oil-derived (e.g., from hydrolysis) fatty acids in a boiling solution with a proportionate amount of urea in methanol. Crystals of urea complexes form as soon as the container is removed from the steam bath used to heat it. The mixture is cooled to 0° C. overnight and subsequently filtered to yield a urea complex. The urea complex is boiled in a large volume of water to dissolve urea and yield an oleic acid-enriched urea mixture. The process can be used for methyl esters as well. D. Swern and W. E. Parker were able to enrich a fatty acid mixture with oleic acid from 45% to 78% using this method. See U.S. Pat. No. 2,838,480.

Adsorption by π(pi)-complexation has been reported as a promising alternative to cryogenic distillation to separate olefins from paraffins. $Ag^+$ and $Cu^+$ ions dispersed on resins, zeolites, silica, and pillared interlayer clays have been used to carry out these separations. A separation of olefins from paraffins using ionic liquids containing silver salts has also been reported (U.S. Pat. No. 6,623,659). Selective adsorption has been used in chromatography columns to separate fatty acid methyl esters of oleic acid from linoleic acid. See Dobson et al., "Silver Ion Chromatography of lipids and Fatty Acids," J. Chromatography B, vol. 671, pp. 197-222, 1995; Emken et al., "Separation of Saturated, Unsaturated, and Acetylenic Fatty Acid Isomers by Silver Resin Chromatography," J. Am. Oil. Chem. Soc., vol. 55, pp. 561-563, 1978.

Some of the advantages and disadvantages of the above-described techniques have been summarized in Table 2 (FIG. 4). Particularly in view of the limitations of these above-described techniques, a more facile and/or more tailorable method of fatty acid/ester separation by degree of unsaturation would be extremely useful—particularly to the extent that it could be integrated with existing processes and sub-processes for the production of biofuels and biolubricants.

BRIEF DESCRIPTION OF THE INVENTION

In an effort to overcome or otherwise address at least some of the limitations of the existing separation processes listed in Table 2 (FIG. 4), in some embodiments the present invention is directed to one or more enrichment processes (methods) that involve a separation or fractionation of monounsaturated fatty acid/ester (lipid) molecules from polyunsaturated fatty acid/ester molecules and/or, correspondingly, monounsaturated molecules from saturated molecules, wherein such processes are largely based on π(pi)-complexation between metal ions (e.g., silver (I) (Ag(I) or $Ag^+$) or other π-complexing metal ions) and unsaturated bonds of the extractible (fatty acid/ester) molecules, wherein a greater degree of unsaturation provides for greater bond strength and corresponding selectivity in the π-complexation. Wherein fatty ester species find such use, the present invention provides for a method to conveniently tailor fatty ester compositions for use as biolubricants/biofuels and in blends thereof.

In some embodiments, the present invention is directed to one or more methods for treating an initial lipid mixture (e.g., a mixture of fatty acids and/or esters), wherein said initial lipid mixture comprises lipids of varying degrees of unsaturation in their aliphatic chains and has a corresponding average unsaturation number (number of carbon-carbon double bonds per molecule averaged across all lipids in the mixture—on a free lipid basis), and wherein said method(s) comprises the steps of: (1) preparing a solution of a silver (I) (Ag(I) or $Ag^+$) salt in an ionic liquid to form a Ag(I) salt solution (extractant); (2) combining the Ag(I) salt solution with a first organic solvent and the initial lipid mixture to form an extraction mixture comprising two primary phases, wherein the Ag(I) salt solution provides for a first primary phase and the first organic solvent provides for a second primary phase; (3) inducing the lipids in the extraction mixture to partition between the two primary phases, wherein a portion of the lipids contained therein gravitate to the first primary phase in such a way as to yield a first extracted phase (extract) comprising lipids having a net increase in their average unsaturation number relative to that of the initial mixture of lipids, and wherein another portion of lipids gravitate to the second primary phase in such a way as to yield a second extracted phase (raffinate) comprising lipids having a net decrease in their average unsaturation number relative to that of the initial mixture of lipids; (4) separating the first extracted phase from the second extracted phase to yield a first extracted mixture and a second extracted mixture; and (5) removing the lipids from the first extracted mixture to yield a first lipid product enriched in unsaturated lipids.

In some embodiments, the present invention is directed to one or more methods for processing lipids, said method(s) comprising the steps of: (1) treating a lipid-containing precursor material so as to yield an initial lipid mixture comprised largely of free lipids, wherein said initial lipid mixture comprises lipids of varying degrees of unsaturation in their aliphatic chains and has a corresponding average unsaturation number; (2) preparing a solution of a Ag(I) salt in an ionic liquid to form a Ag(I) salt solution (extractant); (3) combining the Ag(I) salt solution with a first organic solvent and the initial lipid mixture to form an extraction mixture comprising two primary phases, wherein the Ag(I) salt solution provides for a first primary phase and the first organic solvent provides for a second primary phase; (4) inducing the lipids in the extraction mixture to partition between the two primary phases, wherein some lipids gravitate to the first primary phase in such a way as to yield a first extracted phase (extract) comprising lipids having a net increase in their average unsaturation number relative to that of the initial mixture of lipids, and wherein some other lipids gravitate to the second primary phase in such a way as to yield a second extracted phase (raffinate) comprising lipids having a net decrease in their average unsaturation number relative to that of the initial mixture of lipids; (5) separating the first extracted phase from the second extracted phase to yield a first extracted mixture and a second extracted mixture; and (6) removing the lipids from the first extracted mixture to yield a first lipid product enriched in unsaturated lipids.

Enrichment methods of the present invention are not limited solely to the use of Ag salts. Accordingly, in some embodiments the present invention is directed to one or more methods for manipulating (e.g., fractionating, separating, enriching, etc.) lipids, wherein said manipulating is based largely on differences in unsaturation number, said method(s) comprising the steps of: (1) treating a lipid-containing precursor material so as to yield an initial lipid precursor mixture comprised largely of free lipids, wherein said initial lipid precursor mixture comprises lipids of varying degrees of unsaturation in their aliphatic chains and has a corresponding average unsaturation number; (2) subjecting the initial lipid precursor mixture to fractional crystallization to yield an initial lipid mixture comprised largely of free lipids and having an average unsaturation number that is higher than that of the initial lipid precursor mixture; (3) preparing a solution of a π-complexing metal salt in an ionic liquid to form a metal salt solution (extractant); (4) combining the metal salt solution with a first organic solvent and the initial lipid mixture to form an extraction mixture comprising two primary phases, wherein the metal salt solution provides for a first primary phase and the first organic solvent provides for a second primary phase; (5) inducing the lipids in the extraction mixture to partition between the two primary phases, wherein some lipids gravitate to the first primary phase in such a way as to yield a first extracted phase (extract) comprising lipids having a net increase in their average unsaturation number relative to that of the initial mixture of lipids, and wherein lipids gravitate to the second primary phase in such a way as to yield a second extracted phase (raffinate) comprising lipids having a net decrease in their average unsaturation number relative to that of the initial mixture of lipids; (6) separating the first extracted phase from the second extracted phase to yield a first extracted mixture and a second extracted mixture; and (7) removing the lipids from the first extracted mixture to yield a first lipid product enriched in unsaturated lipids.

The foregoing has outlined rather broadly the features of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIG. 2 (Table 1) illustrates, in tabular form, the distribution of various fatty acids in various types of vegetable oil (values are in %), wherein values are based on a hydrolyzed free lipid basis, and wherein each fatty acid is identified by a CX:Y value in which X equals the number of carbons in the fatty acid, and Y equals the number of carbon-carbon bonds in the aliphatic (fatty) chain;

FIG. 3 depicts two different approaches to producing free lipids (fatty acids and fatty esters), as well as a general separation scheme shown for producing high oleic content bioesters from the free lipids produced by Approach 1 and Approach 2;

FIG. 4 (Table 2) summarizes, in tabular form, advantages and limitations of existing separation technologies;

FIG. 8 (Table 3) depicts selective extraction of linoleic acid in silver-loaded ionic liquid, in accordance with some embodiments of the present invention and as illustrated in Example 2;

FIG. 9 (Equation 1) depicts a separation factor (α) to characterize the extent of separation of linoleic acid from oleic acid during the extraction step, in accordance with some embodiments of the present invention and as described in Example 2;

FIG. 11 (Table 4) illustrates, in tabular format, the selective extractive affinity of linoleic acid in silver loaded ionic liquids, in accordance with some embodiments of the present invention and as described in Example 2.

DETAILED DESCRIPTION OF THE INVENTION

1. Introduction

Figure 1:
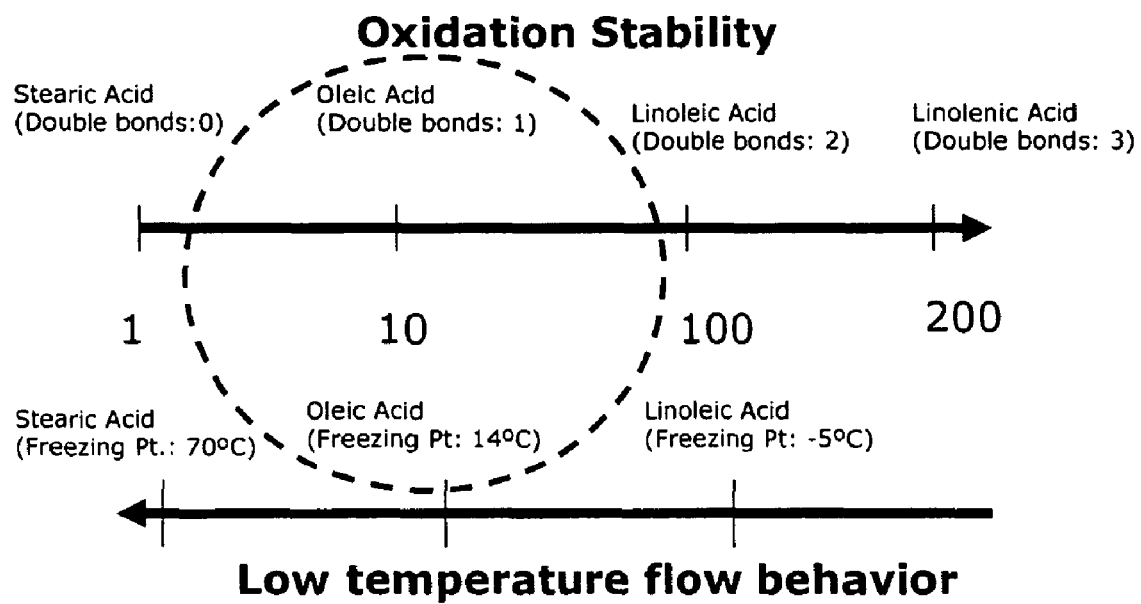
FIG. 1 is a graphical illustration depicting the influence of the degree of unsaturation on oxidation stability and low temperature flow behavior for a variety of fatty acids.

Embodiments of the present invention are, at least in some instances, directed to one or more enrichment processes (methods) that involve a separation or fractionation of monounsaturated fatty acid/ester molecules from polyunsaturated fatty acid/ester molecules and/or, correspondingly, monounsaturated molecules from saturated molecules, wherein such processes are believed to be based largely on π(pi)-complexation between silver (Ag) ions (and other π-complexing metal ions) and unsaturated bonds of the extractible (fatty acid/ester) molecules (vide infra), wherein a greater degree of unsaturation provides for greater bond strength and corresponding selectivity in the π-complexation. Embodiments of the present invention provide for a method to conveniently tailor fatty ester compositions for use as biolubricants/biofuels and in blends thereof.

2. Definitions

Certain terms and phrases are defined throughout this description as they are first used, while certain other terms used in this description are defined below:

The term "lipids," as used herein, collectively refers to components of vegetable oils and animal fats, wherein such components include triglycerides, diglycerides, monoglycerides, fatty acids (carboxylic acids), and fatty esters. Fatty acids and fatty esters can further be referred to as "free lipids."

The term "ionic liquid," as used herein, refers to a liquid comprised exclusively (or almost exclusively) of ions. Ionic liquids referred to herein are typically liquid at room temperature (e.g., 25° C.), but deviations from this (e.g., melting points of up to 100° C. or higher) can fall within the scope of the present invention (vide infra).

The term "unsaturation number," as defined herein, refers to the number of carbon-carbon double bonds (—C=C—) in the aliphatic (fatty) chain of a lipid—on a free lipid basis. For example, oleic acid, a monounsaturated free lipid having the chemical formula $C_{18}H_{34}O_2$, has an unsaturation number of 1. Linoleic acid, a polyunsaturated free lipid having the chemical formula $C_{18}H_{32}O_2$, has an unsaturation number of 2. Stearic acid is a saturated free lipid having the chemical formula $C_{18}H_{36}O_2$, has an unsaturation number of 0. A triglyceride having a linoleic chain, a oleic chain, and a stearic chain, would be treated as three free lipids that collectively have an average unsaturation number of 1. Analogously, a mixture of lipids can be viewed as having an average unsaturation number that is an average of all of the lipids present in the mixture on a free lipid basis. Example 3 (Section 5) illustrates how an average unsaturation number can be determined for lipid mixtures (e.g., canola and palm oils).

The term "extractant," as used herein, refers to the solvent mixture that actively extracts object species, i.e., a π-complexing metal salt solution (extractant) that preferentially complexes unsaturated free lipids (object species) over saturated free lipids.

The term "extract," as used herein, refers to extractant+object species, i.e., the π-complexing metal salt solution after it has extracted and/or preferentially complexed the more unsaturated of the free lipid species. Generally, the extract has a free lipid component with an average unsaturation number that is higher than that of the initial lipid mixture from which it was partially derived.

The term "raffinate," as used herein, refers to the lipid-containing phase/mixture that results from the extractant acting on the initial lipid mixture. This resulting lipid-containing phase/mixture generally has a free lipid component with an average unsaturation number that is lower than that of the initial lipid mixture from which it was partially derived.

The terms "conventional lubricant" and "conventional fuel," as used herein, refer to lubricants and fuels derived from petroleum and/or syngas, the latter involving Fischer-Tropsch chemistry (Fleisch et al., "2002—Emergence of the Gas-to-Liquids Industry: a Review of Global GTL Developments," J. Natural Gas Chemistry, vol. 11, pp. 1-14, 2002).

3. Methods

Figure 5:
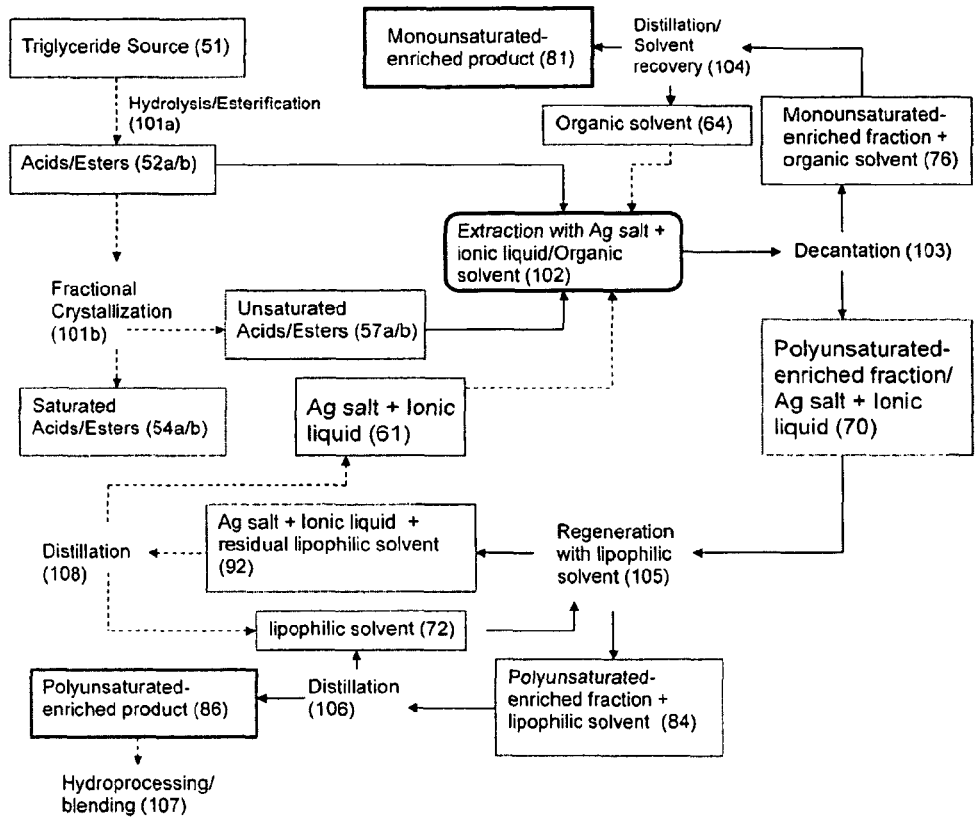
FIG. 5 illustrates, as a process flow diagram, methods for processing lipid-containing mixtures on the basis of their unsaturation level, in accordance with some embodiments of the present invention.

As mentioned in a preceding section, and with partial reference both here and throughout to FIG. 5, in some embodiments, the present invention is directed to method(s) for treating an initial lipid mixture (e.g., 51 or 52), wherein said initial lipid mixture comprises lipids of varying degrees of unsaturation in their aliphatic chains and has a corresponding average unsaturation number, and wherein said method comprises the steps of: preparing a solution of a Ag(I) salt in an ionic liquid to form a silver (I) (Ag(I) or Ag⁺) salt solution (extractant) 61; combining (Step 102) the Ag(I) salt solution 61 with a first organic solvent 64 and the initial lipid mixture to form an extraction mixture comprising two primary phases, wherein the Ag(I) salt solution 61 provides for a first primary phase and the first organic solvent provides for a second primary phase; inducing the lipids in the extraction mixture to partition between the two primary phases, wherein a portion of the lipids contained therein gravitate to the first primary phase in such a way as to yield a first extracted phase (extract) comprising lipids having a net increase in their average unsaturation number relative to that of the initial mixture of lipids, and wherein another portion of lipids gravitate to the second primary phase in such a way as to yield a second extracted phase (raffinate) comprising lipids having a net decrease in their average unsaturation number relative to that of the initial mixture of lipids; separating (e.g., decanting, Step 103) the first extracted phase from the second extracted phase to yield a first extracted mixture 70 and a second extracted mixture 76; and removing the lipids from the first extracted mixture to yield a first lipid product 86 enriched in unsaturated lipids.

In some such above-described method embodiments, the lipids in the initial lipid mixture are selected from the group consisting of fatty esters, fatty acids, triglycerides, diglycerides, monoglycerides, and combinations thereof. The content of the initial lipid mixture is largely dependent on whether or not it is a raw, unprocessed oil, or whether it has been processed. In the case of the latter, the type and extent of such processing helps determine the composition of the initial lipid mixture. Typically, however, in an effort to facilitate separation of fatty acids/esters on the basis of their level of unsaturation, initial feedstocks containing primarily triglycerides are processed to yield mixtures of free lipids and glycerol. The glycerol ($C_3H_5(OH)_3$) can be washed away with water.

In some such above-described method embodiments, such methods further comprise the pre-steps of: (a) pretreating a lipid-containing material so as to yield a pretreated lipid mixture comprised largely of free lipids (e.g., 52a and 52b); and (b) subjecting the pretreated lipid mixture to fractional crystallization (Step 101b) to yield an initial lipid mixture comprised largely of unsaturated free lipids 57a and 57b.

Figure 6:
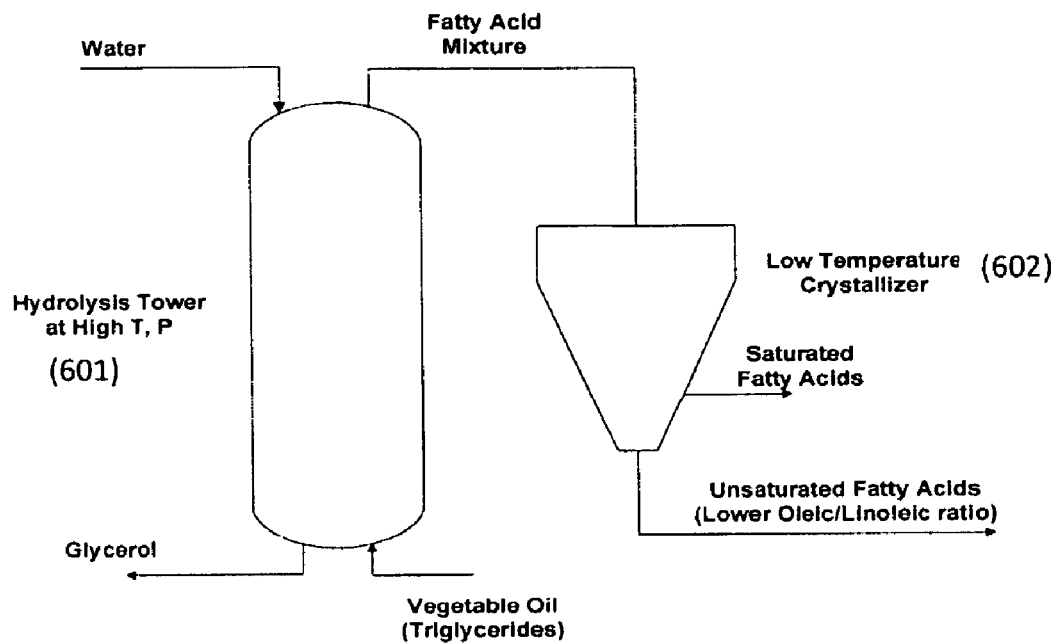
FIG. 6 illustrates a feed preparation procedure (pre-process) for oleic enrichment, in accordance with some embodiments of the present invention.

In some such above-described method embodiments, such methods further comprise a step of pretreating a lipid-containing material (e.g., 51) via hydrolysis (see FIG. 5, Step 101a) to yield an initial lipid mixture comprised largely of fatty acids. As mentioned above, the lipid-containing material is comprised primarily of triglycerides. FIG. 6 illustrates, by way of a process flow diagram, an exemplary fatty acid feed preparation for fatty acid enrichment, in accordance with some embodiments of the present invention. Still referring to FIG. 6, water and a triglyceride-containing vegetable oil are introduced into hydrolysis tower 601 where the triglycerides are hydrolyzed at high temperature and pressure. Glycerol and free fatty acids are produced, the latter of which can be processed in low temperature crystallizer 602 to separate saturated fatty acids from unsaturated fatty acids. Such free fatty acids can be esterified in a subsequent step with an alcohol such as methanol.

In some such above-described method embodiments, such methods further comprise a step of pretreating a lipid-containing material via esterification (see FIG. 5, Step 101a) to yield an initial lipid mixture comprised largely of fatty esters 52b. As in the case of the hydrolysis described above, such a lipid-containing material is comprised largely of triglycerides. Esterification of the triglycerides is usually done with a small alcohol such as methanol ($CH_3OH$). Transesterification of triglycerides in this manner is well known in the art. See, e.g., Antolin et al., "Optimisation of biodiesel production by sunflower oil transesterification," Bioresource Technology, vol. 83, pp. 111-114, 2002.

While not intending to be bound by theory, Ag(I) ions are understood to form π-complexes with molecules possessing carbon-carbon double bonds (see, e.g., Quinn et al., "Coordination Compounds of Olefins with Anhydrous Silver Salts," Canadian Journal of Chemistry, vol. 43, pp. 2896-2910, 1965). Accordingly, the Ag(I) salt is not believed to be particularly limited, but it should be at least moderately soluble in the ionic liquid. In some such above-described method embodiments, the Ag(I) salt is selected from the group consisting of silver tetrafluoroboride ($AgBF_4$), silver acetate (Ag ($C_2H_3O_2$) or Ag(OAc)), silver nitrate ($AgNO_3$), silver fluoride (AgF), and combinations thereof. While not required, the silver salt is sometimes chosen so as to share a common counter ion with the ionic liquid.

Although generally as defined above (vide supra), ionic liquids are typically organic compounds that are liquid at room temperature (~25° C.). They differ from most salts, however, in that they have very low melting points. Although the properties of ionic liquids can be altered through choice of cation-anion pairings, they tend to be liquid over a wide temperature range, can be designed to be insoluble in nonpolar hydrocarbons and/or water, and, depending on the anion, can be highly ionizing (but still have a low dielectric strength). Ionic liquids have essentially no vapor pressure at atmospheric pressure. Most are air and water stable, and they are used herein to solubilize π-complexing metal salts (see, e.g., U.S. Pat. No. 6,623,659). Advantageously, the properties of the ionic liquids can be tailored by varying the cation and anion.

Many ionic liquids are formed by reacting a nitrogen-containing heterocyclic ring, preferably a heteroaromatic ring, with an alkylating agent (e.g., an alkyl halide) to form a quaternary ammonium salt, and performing ion exchange or other suitable reactions with various Lewis acids or their conjugate bases to form ionic liquids. Examples of suitable heteroaromatic rings include substituted pyridines, imidazole, substituted imidazole, pyrrole and substituted pyrroles. These rings can be alkylated with virtually any straight, branched or cyclic $C_{1-20}$ alkyl group, but preferably, the alkyl groups are $C_{1-16}$ groups, since groups larger than this tend to produce low-melting solids rather than ionic liquids. Various triarylphosphines, thioethers, and cyclic and non-cyclic quaternary ammonium salts have also been used. Counterions which have been used include chloroaluminate, bromoaluminate, gallium chloride, tetrafluoroborate, tetrachloroborate, hexafluorophosphate, nitrate, trifluoromethane sulfonate, methylsulfonate, p-toluenesulfonate, hexafluoroantimonate, hexafluoroarsenate, tetrachloroaluminate, tetrabromoaluminate, perchlorate, hydroxide anion, copper dichloride anion, iron trichloride anion, zinc trichloride anion, as well as various lanthanum, potassium, lithium, nickel, cobalt, manganese, and other metal-containing anions. The ionic liquids can either be neutral, acidic or basic. Neutral ionic liquids can be used if the desired products are not to be isomerized. If it does not matter whether the products are isomerized, either neutral or acidic ionic liquids can be used. In one embodiment, a library, i.e., a combinatorial library, of ionic liquids is prepared, for example, by preparing various alkyl derivatives of the quaternary ammonium cation, and varying the associated anions. The acidity of the ionic liquids can be adjusted by varying the molar equivalents and type and combinations of Lewis acids. See, e.g., U.S. Pat. No. 6,623,659; Marsh et al., "Room Temperature Ionic Liquids as Replacements for Conventional Solvents—A Review," Korean J. Chem. Eng., vol. 19(3), pp. 357-362, 2002; Seddon et al., "Influence of chloride, water, and organic solvents on the physical properties of ionic liquids," Pure Appl. Chem., vol. 72(12), pp. 2275-2287, 2000; and Kang et al., "Control of Ionic Interaction in Silver Salt-Polymer Complexes with Ionic Liquids: Implications for Facilitated Olefin Transport," Chem. Mater., vol. 18(7), pp. 1789-1794, 2006.

In some such above-described method embodiments, a particularly useful ionic liquid is 1-butyl-3-methylimidazolium (bmim) and a suitable counter (an)ion. In some such embodiments, the suitable counter anion is selected from the group consisting of tetrafluoroborate hexafluorophosphate ($BF_6^-$), chloride ($Cl^-$), and combinations thereof. As mentioned above, in some such embodiments, the counter ion is chosen to coincide with that of the Ag(I) salt, but this is not a requirement. The anion can also be selected such that the resulting ionic liquid has specific physical properties that would be advantageous to the process.

In some such above-described method embodiments, the first organic solvent 64 is selected from the group consisting of n-alkanes (e.g., n-hexane, n-heptane), iso-alkanes, cycloalkanes, alkenes, aromatic solvents (e.g., toluene, xylene), halogenated solvents (e.g., dichloromethane), ethers (e.g., diethyl ether, tetrahydrofuran), and combinations thereof. Generally, this first organic solvent is chosen or otherwise selected so as to be operable for solvating lipids, particularly free lipids such as fatty acids and fatty esters, and so as to be largely immiscible with the ionic liquid.

In some such above-described method embodiments, the step of inducing involves an agitation means to enhance interfacial contact between the first (61) and second (64) primary phases. The first and second primary phases, being generally immiscible with each other, can benefit from agitation that facilitates transfer (and subsequent complexation) of fatty acids from the second primary phase to the first primary phase (Step 102).

In some such above-described method embodiments, after providing sufficient residence time for mixing in Step 102, the hydrocarbon phase is decanted out (e.g., Step 103) and product is recovered in a separation step (Step 104) (e.g., a distillation process or other separation technique), where the first organic solvent 64 is separated from the lipid product (e.g., 81), the lipid product having a lower average unsaturation number relative to that of the initial lipid mixture. In some such above-described method embodiments, the step of separating involves a drawing off of one phase under conditions substantially devoid of agitative forces.

In some such above-described method embodiments, removing the lipids from the first extracted mixture to yield a first lipid product enriched in unsaturated lipids comprises the substeps of extracting the lipids from the first extracted mixture with a second organic (e.g., lipophilic) solvent 72 to yield a first lipid extracted product 84 and a spent Ag(I) salt solution 61; and distilling (Step 106) the first lipid extracted product to yield the first lipid product 86. The use of such a secondary organic solvent 72 to extract lipids from the first extracted mixture is typically required because direct distillation of lipid molecules from the first extracted mixture (extract) is typically not possible because the object lipid molecules typically boil at temperatures near 280° C. (under atmospheric conditions), which is an energetically unfavorable step and is generally damaging to the ionic liquids.

In some such above-described method embodiments, the Ag(I) salt and the ionic liquid of the spent Ag(I) salt solution are recycled (e.g., Step 105). Such recycle typically involves the distillation (e.g., Step 108) of the Ag(I) salt+ionic liquid+residual second organic solvent 92. Similarly, in some such embodiments, the second organic solvent 72 is recycled subsequent to the step of distilling (indicated by dotted line in FIG. 5).

In some such above-described method embodiments, lipids are substantially isolated from the second lipid product 76 via a distillation process (Step 104) to yield a second lipid product 81 having an average unsaturation number that is less than that of the initial lipid mixture and a spent first organic solvent 64. In some such embodiments, the first organic solvent is recycled (indicated by dotted line in FIG. 5).

In some such above-described method embodiments, the first and second lipid products, generally comprising free lipids in the form of fatty acids and/or fatty esters, typically comprise free lipid molecules having from at least 14 carbon atoms to at most 22 carbon atoms, and more typically from at least 16 carbon atoms to at most 18 carbon atoms. The molecular weight (and hence, number of carbon atoms) of such free lipids largely depend on the nature/properties of the feedstock material from which they were derived and/or the alcohol used to esterify them (if they are fatty esters).

Depending on the intended application (biofuel or biolubricant), the above method may be engineered to have longer or shorter fatty chains.

In some such above-described method embodiments, such methods further comprise a step of hydrotreating the first lipid product 86 to yield a first hydrotreated product (Step 107). Analogously, in some or other such embodiments, such methods can further comprise a step of hydrotreating the second lipid product 81 to yield a second hydrotreated product.

In some such above-described method embodiments, such methods further comprise a step of blending the first lipid product 86 with a fluid type selected from the group consisting of biolubricants, biofuels, conventional petroleum lubricants, conventional petroleum fuels, and combinations thereof. Similarly, in some or other such embodiments, such methods further comprise a step of blending the second lipid product 81 with a fluid type selected from the group consisting of biolubricants, biofuels, conventional petroleum lubricants, conventional petroleum fuels, and combinations thereof.

4. Variations

A variation (i.e., alternate embodiment(s)) on the above-described method embodiments involves the use of metal salts other than Ag(I) salts. Generally, such metal salts can be selected to have transition metal ions from the d-block of the periodic table, although lanthanide and/or actinide metals may also find use. While not intending to be bound by theory, these metal ions can form a sigma($\sigma$)-bond to carbon, and in addition, the unique characteristics of the d orbital in these metal ions can form bonds with the unsaturated olefins in a process called "back-donation." Typical metal ions of such metal salts include, but are not limited to, copper(I), gold(I), nickel(II), platinum(II), palladium(II), and the like. Copper salts include copper halide salts, preferably copper (I) chloride. The concentration of metal salt in the ionic liquid is typically between about 5 wt % and 20 wt %, but the amount can be higher or lower, depending on a variety of factors, including the solubility of the salt in the ionic liquid. See, e.g., Bond, "Adsorption and Co-ordination of Unsaturated Hydrocarbons with Metal Surfaces and Metal Atoms," Discuss. Faraday Soc., vol. 41, pp. 200-214, 1966.

Other variations on the above-described method embodiments include, but are not limited to, performing chemistry on the unsaturated fatty acids/esters at any point in any of the above-described method embodiments. Such chemistry includes, but is not limited to, that described in United States Patent Application Publication Nos. 20080248982 and 200801194444.

5. Examples

The following examples are provided to demonstrate particular embodiments of the present invention. It should be appreciated by those of skill in the art that the methods disclosed in the examples which follow merely represent exemplary embodiments of the present invention. However, those of skill in the art should, in light of the present disclosure, appreciate that many changes can be made in the specific embodiments described and still obtain a like or similar result without departing from the spirit and scope of the present invention.

Example 1

This Example serves to illustrate, by way of a process flow diagram, an exemplary process for producing an oleic acid enriched product from a mixture of oleic acid (monounsaturated fatty acid) and linoleic acid (polyunsaturated fatty acid), in accordance with some embodiments of the present invention.

Figure 7:
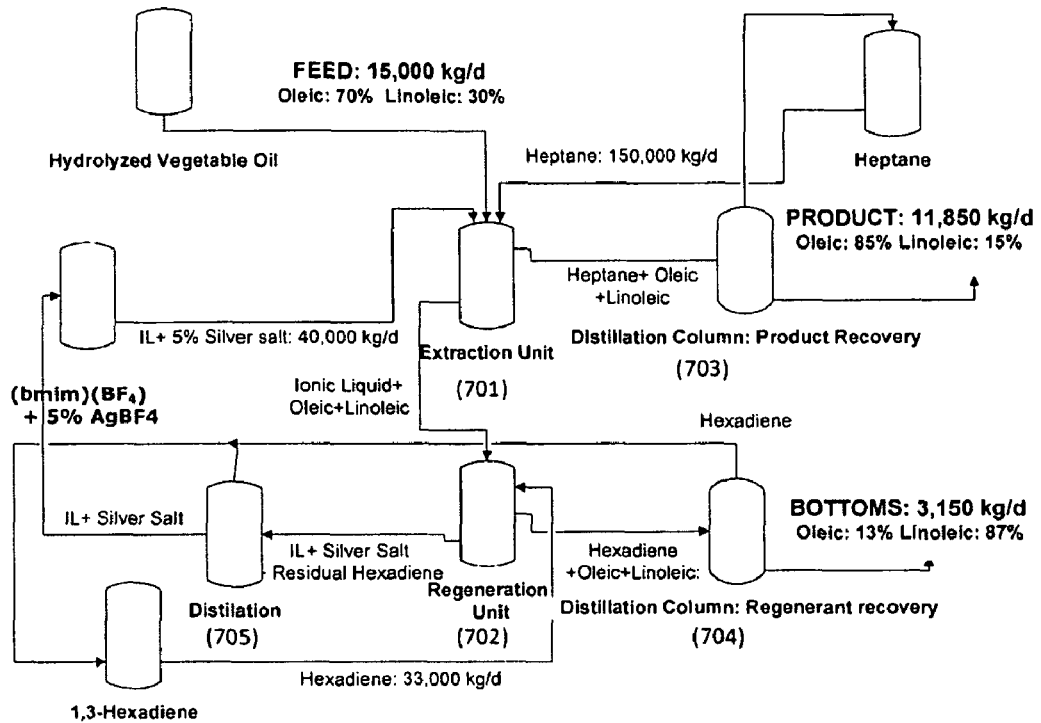
FIG. 7 is a process flow diagram illustrating an oleic acid enrichment process, in accordance with some embodiments of the present invention.

Referring to the process flow diagram of FIG. 7, in this example, a feed of 15,000 kg/day initial mixture of oleic acid and linoleic acid (70% oleic, 30% linoleic) is mixed with heptanes in extraction unit 701, and the resulting solution is treated with 1-butyl-3-methylimidazolium tetrafluoroborate (ionic liquid, [bmim][$BF_4$]) containing 5% silver tetrafluoroborate (silver salt, $AgBF_4$) by weight. After sufficient extraction time, the heptane phase (enriched in oleic acid relative to the initial mixture) is separated from the ionic liquid phase (enriched in linoleic acid relative to the initial mixture), and an oleic acid-enriched product is obtained by removing the heptanes in distillation column 703.

The ionic liquid (IL) phase (enriched in linoleic acid relative to the initial mixture) is sent to regeneration unit 702 where it is mixed with 1,3-hexadiene ("hexadiene"). The hexadiene extracts the fatty acids from the IL phase to yield a regenerated IL phase (typically having some amount of residual hexadiene that can be removed via distillation in distillation column 705) and a hexadiene phase enriched in linoleic acid. The hexadiene phase is then processed in distillation column 704 to yield a bottoms product that is enriched in linoleic acid relative to the initial mixture. Note that hexadiene is used here because it preferentially displaces the lipid molecules from the silver $\pi$-complexing sites, and it can be subsequently removed via distillation at approximately 75° C. Note also that hexadiene is used in this manner because direct distillation of lipid molecules from the extract is typically not possible because the object lipid molecules typically boil at temperatures near 280° C. (under atmospheric conditions), which is an energetically unfavorable step and is generally damaging to the ionic liquids (vide supra).

The approximately 11,850 kg/day of oleic acid-enriched products obtained after extraction/enrichment contains 85% oleic acid. The approximately 3,150 kg/day bottoms product contains 13% of oleic acid, and its content can be adjusted by partial hydrogenation of the feedstock composition or the bottoms product composition in a hydrotreater.

Example 2

This Example serves to illustrate the effect of the Ag(I) salt concentration on the enrichment process for three initial mixtures having differing ratios of oleic:linoleic acid, in accordance with some embodiments of the present invention.

Referring to Table 3 (FIG. 8), in this example, mixtures of oleic acid and linoleic acid in different proportions (i.e., ratios) were prepared in heptane to generate feedstock solutions 1-3. Four grams of each feedstock solution was treated with 4 grams each of four different solutions of 1-butyl-3-methylimidazolium tetrafluoroborate ([bmim][$BF_4$]) containing 5%, 10%, 15%, and 20% silver tetrafluoroborate ($AgBF_4$) by weight, respectively. Table 3 shows the change in oleic and linoleic acid concentration of the heptane-fatty acid mixture before and after extraction/enrichment with each of the four Ag(I) salt solutions.

Figure 10:
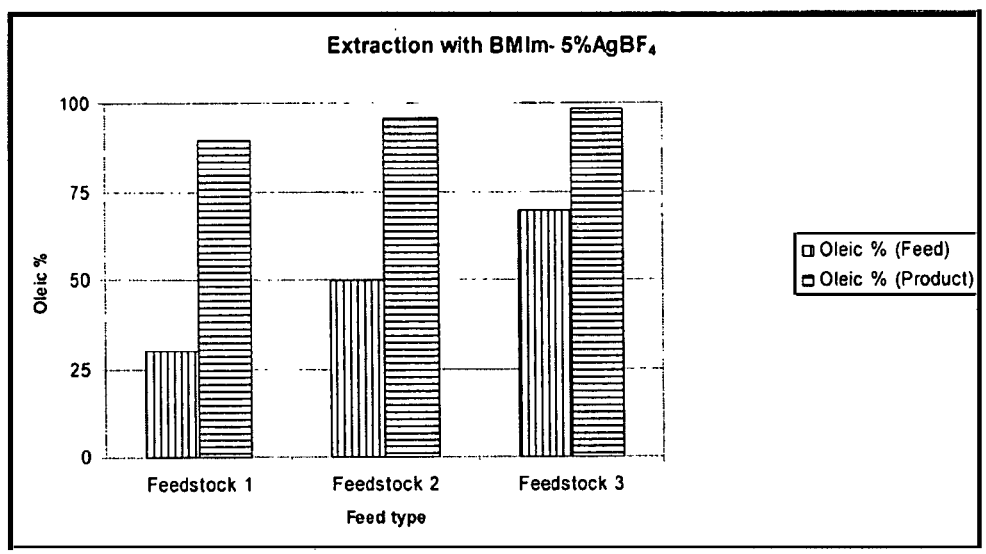
FIG. 10 depicts oleic acid enrichment in feed after treatment with silver loaded ionic liquid, in accordance with some embodiments of the present invention and as described in Example 2.

For the 5% Ag(I) salt case, FIG. 10 shows the enrichment in oleic acid during the extraction/enrichment process for each of the three feedstocks. In Table 4 (FIG. 11), the Ag(I) salt complexation capacity and separation factor of the process have been obtained, wherein the separation factor is defined by Eq. 1 (FIG. 9). A fairly high separation factor is obtained when compared to data available in the literature. See, e.g., U.S. Pat. No. 4,049,688.

The extraction material (Ag(I) salt and IL) was regenerated in a 10% 1,3-hexadiene/heptane solution. Approximately 55% of the extracted oleic acid and 15% of the extracted linoleic acid were recovered. It is postulated that 70-90% of the acids can be recovered using higher strength hexadiene. The results will also improve with higher temperature regeneration sub-processes, as pi-complexation weakens at raised temperatures.

Example 3

This Example serves to illustrate how average unsaturation number can be determined for lipid mixtures such as canola oil and palm oil.

Referring to Table 1 (FIG. 2), canola oil comprises 6 percent saturated free lipids (4% palmitic acid and 2% stearic—in a hydrolyzed state), 62 percent monounsaturated free lipids (oleic acid), 22 percent di-unsaturated free lipids (linoleic acid), and 10 percent tri-unsaturated free lipids (α-linoleic acid). Such a compositional mixture therefore can be said to have an average unsaturation number of 1.36, wherein there are 1.36 double bonds per molecule of the composition.

Referring again to Table 1, hydrolyzed palm oil comprises 50 percent saturated free lipids (as fatty acids), 40 percent monounsaturated free lipids, and 10 percent di-unsaturated free lipids. Accordingly, the average unsaturation number for the mixture is 0.6, meaning that there are 0.6 carbon-carbon double bonds per molecule in the compositional mixture.

6. Summary

The foregoing describes method embodiments for manipulating bio-derived lipids, within a given population or mixture of lipids, on the basis of their level of unsaturation, i.e., their unsaturation number (vide supra). While not intending to be bound by theory, such manipulation is generally effected by the interaction with π-complexing metal salts in an ionic liquid solvent, wherein lipids of higher levels of unsaturation tend to be preferentially complexed with the metal ions, thereby allowing separation and/or enrichment of lipids on the basis of their unsaturation number.

All patents and publications referenced herein are hereby incorporated by reference to the extent not inconsistent herewith. It will be understood that certain of the above-described structures, functions, and operations of the above-described embodiments are not necessary to practice the present invention and are included in the description simply for completeness of an exemplary embodiment or embodiments. In addition, it will be understood that specific structures, functions, and operations set forth in the above-described referenced patents and publications can be practiced in conjunction with the present invention, but they are not essential to its practice. It is therefore to be understood that the invention may be practiced otherwise than as specifically described without actually departing from the spirit and scope of the present invention as defined by the appended claims.

What is claimed:

1. A method for treating an initial lipid mixture, wherein said initial lipid mixture comprises lipids of varying degrees of unsaturation in their aliphatic chains and has a corresponding average unsaturation number, and wherein said method comprises the steps of:
    a) preparing a solution of an Ag(I) salt in an ionic liquid to form a Ag(I) salt solution;
    b) combining the Ag(I) salt solution with a first organic solvent and the initial lipid mixture to form an extraction mixture comprising two primary phases, wherein the Ag(I) salt solution provides for a first primary phase and the first organic solvent provides for a second primary phase;
    c) inducing the lipids in the extraction mixture to partition between the two primary phases, wherein a portion of the lipids contained therein gravitate to the first primary phase in such a way as to yield a first extracted phase comprising lipids having a net increase in their average unsaturation number relative to that of the initial mixture of lipids, and wherein another portion of lipids gravitate to the second primary phase in such a way as to yield a second extracted phase comprising lipids having a net decrease in their average unsaturation number relative to that of the initial mixture of lipids;
    d) separating the first extracted phase from the second extracted phase to yield a first extracted mixture and a second extracted mixture; and
    e) removing the lipids from the first extracted mixture to yield a first lipid product enriched in unsaturated lipids.

2. The method of claim 1, wherein the lipids in the initial lipid mixture are selected from the group consisting of fatty esters, fatty acids, triglycerides, diglycerides, monoglycerides, and combinations thereof.

3. The method of claim 1, further comprising a step of pretreating a lipid-containing material via hydrolysis to yield an initial lipid mixture comprising fatty acids.

4. The method of claim 1, further comprising a step of pretreating a lipid-containing material via esterification to yield an initial lipid mixture comprising fatty esters.

5. The method of claim 1, further comprising the pre-steps of:
    a) pretreating a lipid-containing material so as to yield a pretreated lipid mixture comprising free lipids; and
    b) subjecting the pretreated lipid mixture to fractional crystallization to yield an initial lipid mixture comprised largely of unsaturated free lipids.

6. The method of claim 1, wherein the Ag(I) salt is selected from the group consisting of $AgBF_4$, AgOAc ($C_2H_3O_2^-$), $AgNO_3$, AgF, and combinations thereof.

7. The method of claim 1, wherein the ionic liquid is a bmim-based ionic liquid having a counter ion selected from the group consisting of tetrafluoroborate ($BF_4^-$), hexafluorophosphate ($PF_6^-$), chloride ($Cl^-$), and combinations thereof.

8. The method of claim 1, wherein the first organic solvent is selected from the group consisting of alkanes, arenes, alkenes, ethers, halogenated solvents, cycloalkanes, and combinations thereof.

9. The method of claim 1, wherein the step of inducing involves an agitation means to enhance interfacial contact between the first and second primary phases.

10. The method of claim 1, wherein the step of separating involves a drawing off of one phase under conditions substantially devoid of agitative forces.

11. The method of claim 1, wherein removing the lipids from the first extracted mixture to yield a first lipid product enriched in unsaturated lipids comprises the substeps of:
    a) extracting the lipids from the first extracted mixture with a second organic solvent to yield a first lipid extracted product and a spent Ag(I) salt solution; and
    b) distilling the first lipid extracted product to yield the first lipid product.

12. The method of claim 11, wherein the Ag(I) salt and the ionic liquid of the spent Ag(I) salt solution are recycled.

13. The method of claim 11, wherein the second organic solvent is recycled subsequent to the step of distilling.

14. The method of claim 1, wherein lipids are substantially isolated from the second lipid product via a distillation process to yield a second lipid product having an average unsaturation number that is less than that of the initial lipid mixture and a spent first organic solvent.

15. The method of claim 14, wherein the first organic solvent is recycled.

16. The method of claim 11, further comprising a step of hydrotreating the first lipid product to yield a first hydrotreated product.

17. The method of claim 1, further comprising a step of blending the first lipid product with a fluid type selected from the group consisting of biolubricants, biofuels, conventional petroleum lubricants, conventional petroleum fuels, and combinations thereof.

18. The method of claim 14, further comprising a step of hydrotreating the second lipid product to yield a second hydrotreated product.

19. The method of claim 1, further comprising a step of blending the second lipid product with a fluid type selected from the group consisting of biolubricants, biofuels, conventional petroleum lubricants, conventional petroleum fuels, and combinations thereof.

20. A method for processing lipids, said method comprising the steps of:
   a) treating a lipid-containing precursor material so as to yield an initial lipid mixture comprised largely of free lipids, wherein said initial lipid mixture comprises lipids of varying degrees of unsaturation in their aliphatic chains and has a corresponding average unsaturation number;
   b) preparing a solution of a Ag(I) salt in an ionic liquid to form a Ag(I) salt solution;
   c) combining the Ag(I) salt solution with a first organic solvent and the initial lipid mixture to form an extraction mixture comprising two primary phases, wherein the Ag(I) salt solution provides for a first primary phase and the first organic solvent provides for a second primary phase;
   d) inducing the lipids in the extraction mixture to partition between the two primary phases, wherein some lipids gravitate to the first primary phase in such a way as to yield a first extracted phase comprising lipids having a net increase in their average unsaturation number relative to that of the initial mixture of lipids, and wherein some other lipids gravitate to the second primary phase in such a way as to yield a second extracted phase comprising lipids having a net decrease in their average unsaturation number relative to that of the initial mixture of lipids;
   e) separating the first extracted phase from the second extracted phase to yield a first extracted mixture and a second extracted mixture; and
   f) removing the lipids from the first extracted mixture to yield a first lipid product enriched in unsaturated lipids.

21. The method of claim 20, wherein the lipids in the initial lipid mixture are selected from the group consisting of fatty esters, fatty acids, and combinations thereof.

22. The method of claim 21, wherein removing the lipids from the first extracted mixture to yield a first lipid product comprises the substeps of:
   a) extracting the lipids from the first extracted mixture with a second organic solvent to yield a first lipid extracted product and a spent Ag(I) salt solution; and
   b) distilling the first lipid extracted product to yield a first lipid product.

23. A method for manipulating lipids, comprising the steps of:
   a) treating a lipid-containing precursor material so as to yield an initial lipid precursor mixture comprising free lipids, wherein said initial lipid precursor mixture comprises lipids of varying degrees of unsaturation in their aliphatic chains and has a corresponding average unsaturation number;
   b) subjecting the initial lipid precursor mixture to fractional crystallization to yield an initial lipid mixture comprised largely of free lipids and having an average unsaturation number that is higher than that of the initial lipid precursor mixture;
   c) preparing a solution of a pi-complexing metal salt in an ionic liquid to form a metal salt solution;
   d) combining the metal salt solution with a first organic solvent and the initial lipid mixture to form an extraction mixture comprising two primary phases, wherein the metal salt solution provides for a first primary phase and the first organic solvent provides for a second primary phase;
   e) inducing the lipids in the extraction mixture to partition between the two primary phases, wherein some lipids gravitate to the first primary phase in such a way as to yield a first extracted phase comprising lipids having a net increase in their average unsaturation number relative to that of the initial mixture of lipids, and wherein lipids gravitate to the second primary phase in such a way as to yield a second extracted phase comprising lipids having a net decrease in their average unsaturation number relative to that of the initial mixture of lipids;
   f) separating the first extracted phase from the second extracted phase to yield a first extracted mixture and a second extracted mixture; and
   g) removing the lipids from the first extracted mixture to yield a first lipid product enriched in unsaturated lipids.

24. The method of claim 23, wherein removing the lipids from the first extracted mixture to yield a first lipid product enriched in unsaturated lipids comprises the steps of:
   a) extracting the lipids from the first extracted mixture with a second organic solvent to yield a first lipid extracted product and a spent metal salt solution; and
   b) distilling the first lipid extracted product to yield the first lipid product.

25. The method of claim 24, wherein lipids are substantially isolated from the second lipid product via a distillation process to yield a second lipid product having an average unsaturation number that is less than that of the initial lipid mixture and a spent first organic solvent.

26. A method for enriching monounsaturated fatty acids and/or monounsaturated fatty esters from a free lipid mixture, said method comprising the steps of:
   a) treating a lipid-containing precursor material so as to yield an initial lipid precursor mixture comprising free lipids, wherein said initial lipid precursor mixture comprises lipids of varying degrees of unsaturation in their aliphatic chains and has a corresponding average unsaturation number;
   b) preparing a solution of a pi-complexing metal salt in an ionic liquid to form a metal salt solution;
   c) combining the metal salt solution with a first organic solvent and the initial lipid precursor mixture to form an extraction mixture comprising two primary phases, wherein the metal salt solution provides for a first primary phase and the first organic solvent provides for a second primary phase;

d) inducing the lipids in the extraction mixture to partition between the two primary phases, wherein some lipids gravitate to the first primary phase in such a way as to yield a first extracted phase comprising lipids having a net increase in their average unsaturation number relative to that of the initial mixture of lipids, and wherein some other lipids gravitate to the second primary phase in such a way as to yield a second extracted phase comprising lipids having a net decrease in their average unsaturation number relative to that of the initial mixture of lipids;

e) separating the first extracted phase from the second extracted phase to yield a first extracted mixture and a second extracted mixture; and f) removing the lipids from either one of the first or second extracted mixtures to yield a lipid product enriched in monounsaturated lipids.

27. The method of claim 26, wherein the first extracted mixture is enriched in lipids having an unsaturation of 2 relative to the free lipid mixture and wherein the second extracted mixture is enriched in lipids having an unsaturation of 1 relative to the free lipid mixture.

* * * * *